United States Patent [19]
Burrell

[11] 3,818,572
[45] June 25, 1974

[54] MANUFACTURE OF FRUIT BASKETS AND THE LIKE

[75] Inventor: Theodore Alexander Burrell, Oakville, Ontario, Canada

[73] Assignee: Oakville Wood Specialties Limited, Oakville, Ontario, Canada

[22] Filed: May 21, 1973

[21] Appl. No.: 361,860

[30] Foreign Application Priority Data
June 23, 1972 Canada.............................. 145480

[52] U.S. Cl............................................... 29/208 B
[51] Int. Cl........................ B23p 19/04, B23q 7/10
[58] Field of Search .......... 29/208 B, 211 R, 208 R, 29/208 D, 211 D

[56] References Cited
UNITED STATES PATENTS
3,524,241   8/1970   Walkup et al..................... 29/208 B Primary Examiner—Thomas H. Eager
Attorney, Agent, or Firm—Fetherstonhaugh & Co.

[57] ABSTRACT

An apparatus for mounting a handle on a basket such as a fruit basket having a pair of oppositely disposed side walls, each formed with the U-shaped slot to receive an end of a handle. The apparatus consists of a frame having a handle mounting station therein, means for mounting a basket in said handle mounting station and slot opening finger means disposed on opposite sides of the station and movable between a retracted position outwardly of the station and an extended position inwardly of the station to open the slots of a basket in use. Clamping means is also provided for clamping a handle in a position with the ends thereof aligned with the slots of a basket in said station. Drive means is also provided for moving the handle clamping means towards and away from the station, so that the handle clamping means may engage the slot opening finger means as the handle clamping means moves towards the station to cause the finger means to move to the extended position to open the slots to receive a handle. The handle clamping means is thereafter opened and the basket with the handle attached is ejected.

10 Claims, 8 Drawing Figures

PATENTED JUN 25 1974 3,818,572

MANUFACTURE OF FRUIT BASKETS AND THE LIKE

This invention relates to the manufacture of baskets such as fruit baskets. In particular, this invention relates to an apparatus for automatically forming and locating a handle on a fruit basket.

Presently handles which are mounted on fruit baskets are formed to a U-shaped configuration and manually located on the sides of the basket and stapled, flued or otherwise secured in position. This is a costly and time consuming manual operation.

The apparatus of the present invention reduces the manual labour involved in the locating of the handles on the basket and thereby reduces the costs involved in the assembly of the baskets.

According to an embodiment of the present invention, there is provided an apparatus for mounting a handle on a basket having a pair of oppositely disposed side walls each formed with a U-shaped slot to receive an end of a handle. The apparatus comprises a frame having a handle mounting station therein and means for mounting a basket in the handle mounting station. The apparatus also includes slot opening finger means disposed on opposite sides of the mounting station and movable between a retracted position outwardly of the station and an extended position inwardly of the station to open the slots of the basket in use. In addition, the apparatus includes means for clamping a handle in a position with the ends thereof aligned with the slots of the basket in said station and means for moving each handle clamping means towards and away from said station, and means on said handle clamping means for engaging said finger means as said handle clamping means moves towards said station to cause said finger means to move to said extended position to open said slot.

The invention will be more clearly understood after reference to the following detailed specification read in conjunction with the drawings wherein.

Figure 2:
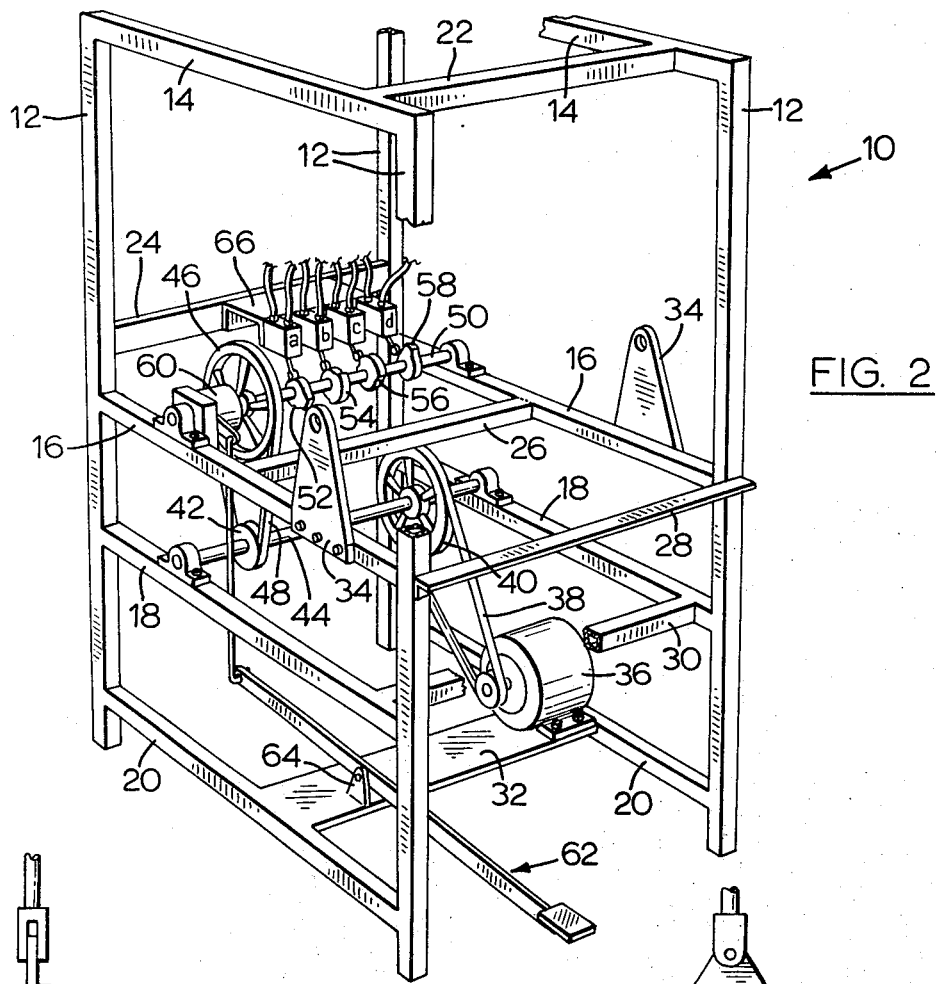
FIG. 2 is a front view of the frame in which the assembly of FIG. 1 is mounted.

The reference numeral 10 refers generally to a frame, best shown in FIG. 2, which includes four vertical posts 12, longitudinal beams 14, 16, 18 and 20 and transverse beams 22, 24, 26, 28, 30 and 32. The frame also includes a pair of support brackets 34 which project upwardly from the longitudinal beams 16. An electric motor 36 is mounted on the transverse beam 32 and is connected by drive belt 38 to pulley 40 which is in turn connected to pulley 42 by a drive shaft 44. Pulley 42 is connected to pulley 46 be means of a drive belt 48. A shaft 50 is rotatably driven by the pulley 46 through a clutch mechanism 60. Cams 52, 54, 56 and 58 are mounted on the shaft 50. The clutch mechanism 60 is of a well known type adapted to engage or disengage the coupling between the pulley 46 and shaft 50 as required in use. The clutch 60 is operated by means of a foot pedal lever assembly 62 which is pivotally mounted on support brackets 64 carried by the transverse beam 32. Pneumatic valves $a$, $b$, $c$ and $d$ are mounted on a channel member 66 in a position to engage the cams 52, 54, 56 and 58 respectively.

A pair of vertically extending guide rails 70 are mounted on the frame 10 to extend longitudinally thereof. The structure used for mounting the guide rails 70 in the vertical position has not been shown in order to avoid over-complicating the FIG. 1 of the drawings. However, it will be understood that these members may be supported by suitable braces extending from any of the adjacent frame members previously described. A face plate 72 is mounted to reciprocate within the guide rails 70 and a pneumatic cylinder 74 connects the face plate 72 to the transverse beam member 22. A latch member 76 is pivotally connected at the upper end of each of the guide rails 70. A plate 78 having a pair of longitudinally dovetail-shaped slots 80 formed therein is mounted on the face plate 72. A handle former 82 is mounted to reciprocate on the plate 78 and has dovetail-shaped lugs 84 slidably mounted in the slots 80. The former 82 has a lower surface 86 formed to the contour of the handle to be formed therein.

A pair of cam rollers 88 are rotatably mounted in brackets 90 which project outwardly from the side edges of the former 82.

Figure 3:
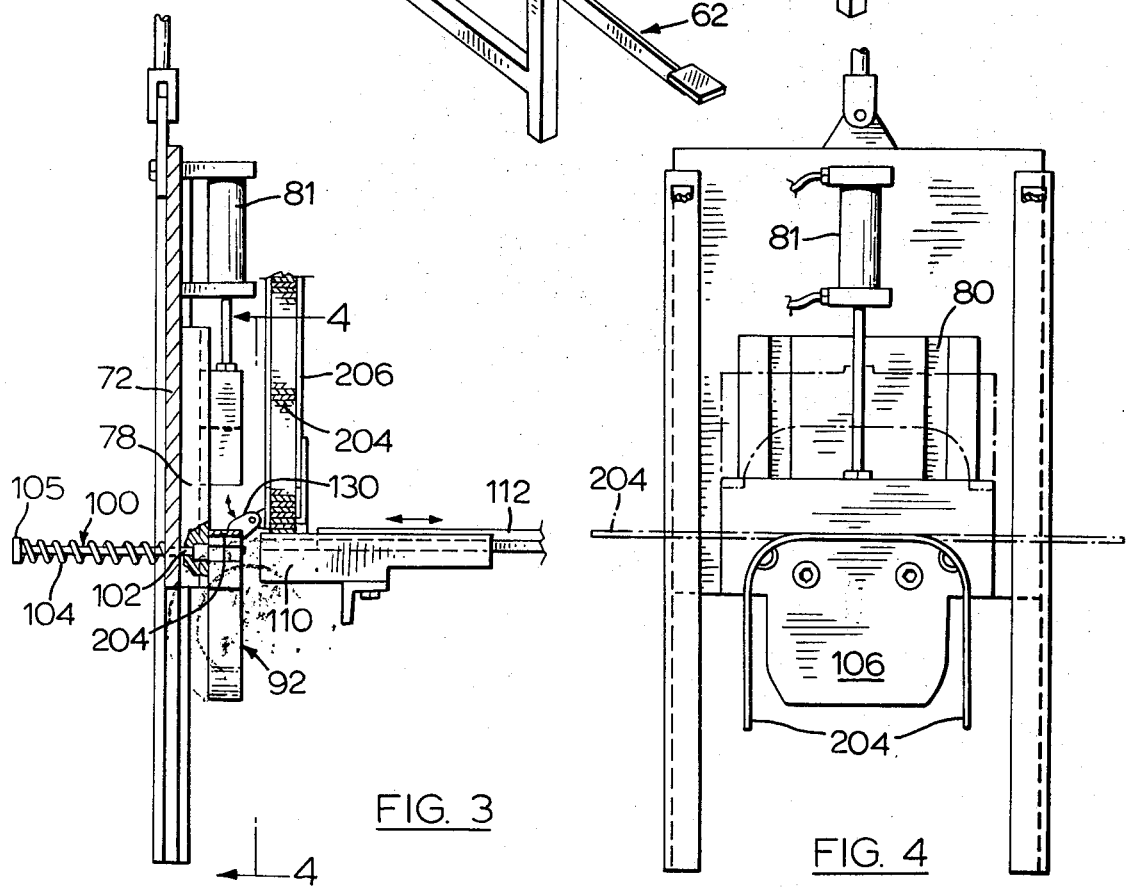
FIG. 3 is a sectional side view in the direction of the arrows 3—3 of FIG. 1.

An anvil 92 having an upper surface 94 formed to the contour of the handle to be formed therein is mounted by means of mounting screws 96 on the lower end of the plate 78 in alignment with the former 82. Slots 98 are formed on the surface 94 of the anvil to provide clearance for the ejection pins 100 (FIG. 3) which are mounted to reciprocate in passages 102 formed in the face plate 72 and plate 78. A spring 104 serves to urge the ejection pins to the retracted position.

Figure 6:
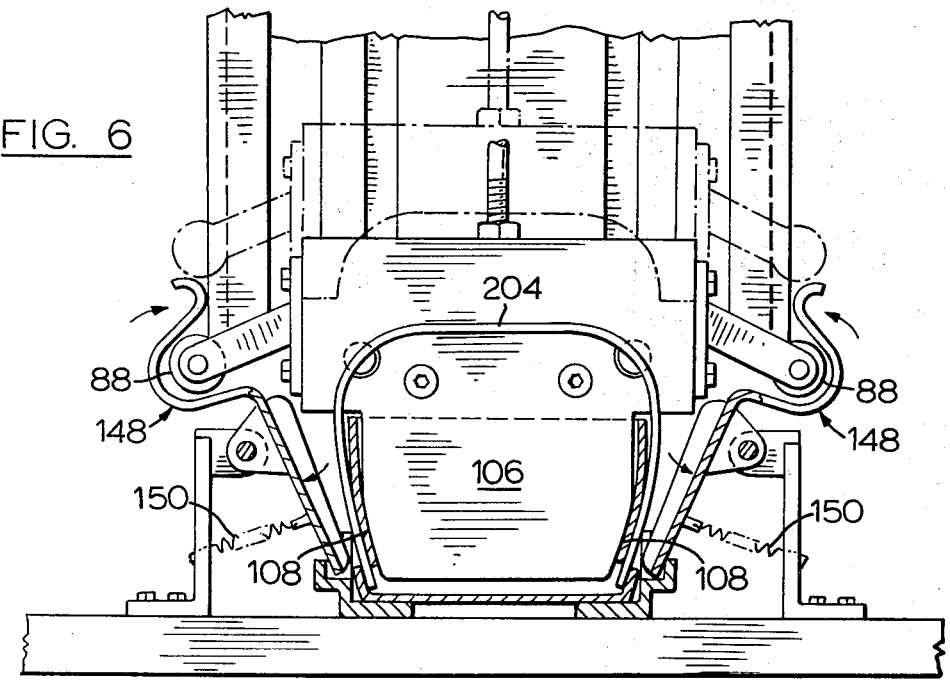
FIG. 6 is a view similar to FIG. 5 showing a still further step in the method of the present invention.

The lower end 106 of the anvil 92 is formed with side edges 108 which are adapted to fit within a basket (FIG. 6) so as to provide a stop for limiting the inward deflection of the basket as will be described hereinafter.

A dispenser mechanism for dispensing cartons from a carton storage frame consists of a pair of guide blocks 110 mounted on the transverse beam member 28 and formed with longitudinal slots to receive pusher arms 112 which are connected by means of transverse extensions 114, longitudinal arms 116 and lever 118 to shaft 120 which is pivotally mounted in brackets 34. A pneumatic cylinder 122 is pivotally mounted at one end on transverse beam member 26 and connected at the upper end by means of a lever arm 124 to the shaft 120. Plates 126 are mounted on transverse beam 28 and project upwardly therefrom and plates 128 are mounted on the plate 126 in a spaced relationship with respect to the plane of the inner face of the guide rails 70 so as to form an enclosure therebetween to receive the lower end of a handle storage cartridge as will be described hereinafter. A pair of small latch fingers 130 are mounted on brackets 132 which project rearwardly from the plates 126.

In addition to the rejector pin assembly 100 previously described, there is provided a pair of ejector pin engaging pads 134 (only one shown) mounted on a transverse support plate 136 which is secured to the inner end of a pneumatic cylinder 138, the other end of which is pivotally mounted on the frame (not shown). The pneumatic cylinder 138 is operable to move the pads 134 into engagement with the head 105 of the ejector pin in use.

A pair of angle brackets 140 are mounted on the transverse beam member 30. A transverse plate 142 extends between the inner ends of the channel members 140 to close the inner ends thereof. Each of the channel members 140 is formed with a recessed portion 144. A pair of brackets 146 pivotably mount a pair of slot opening fingers 148 and tension springs 150 are connected to the lower ends 152 of the fingers so as to urge the lower ends inwardly of said recesses 144. Each of the fingers 148 has a lower end 152 in the form of a U-shaped channel having flanges 154. The upper end 156 of each finger is formed to provide a cam track having an inwardly directed crest at its upper end and an outwardly directed valley downwardly therefrom.

Figure 7:
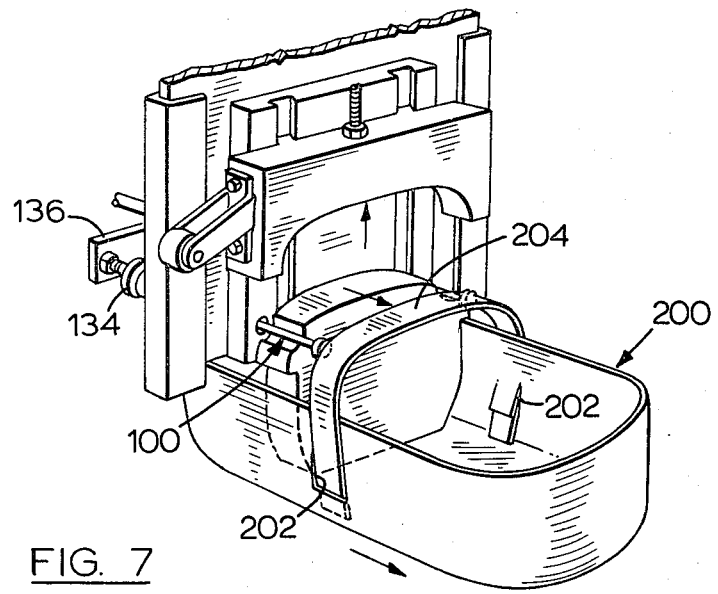
FIG. 7 is a partial pictorial view illustrating the ejection of a basket after the handle has been located thereon.

A basket of a type to which a handle is to be attached is illustrated in FIG. 7 of the drawings and generally identified by the reference numeral 200. The basket is preferably made from paperboard which is slit to provide U-shaped slots 202 on opposite side walls. The handle 204 is preferably made from wood which has been rendered pliable by steaming.

Figure 1:
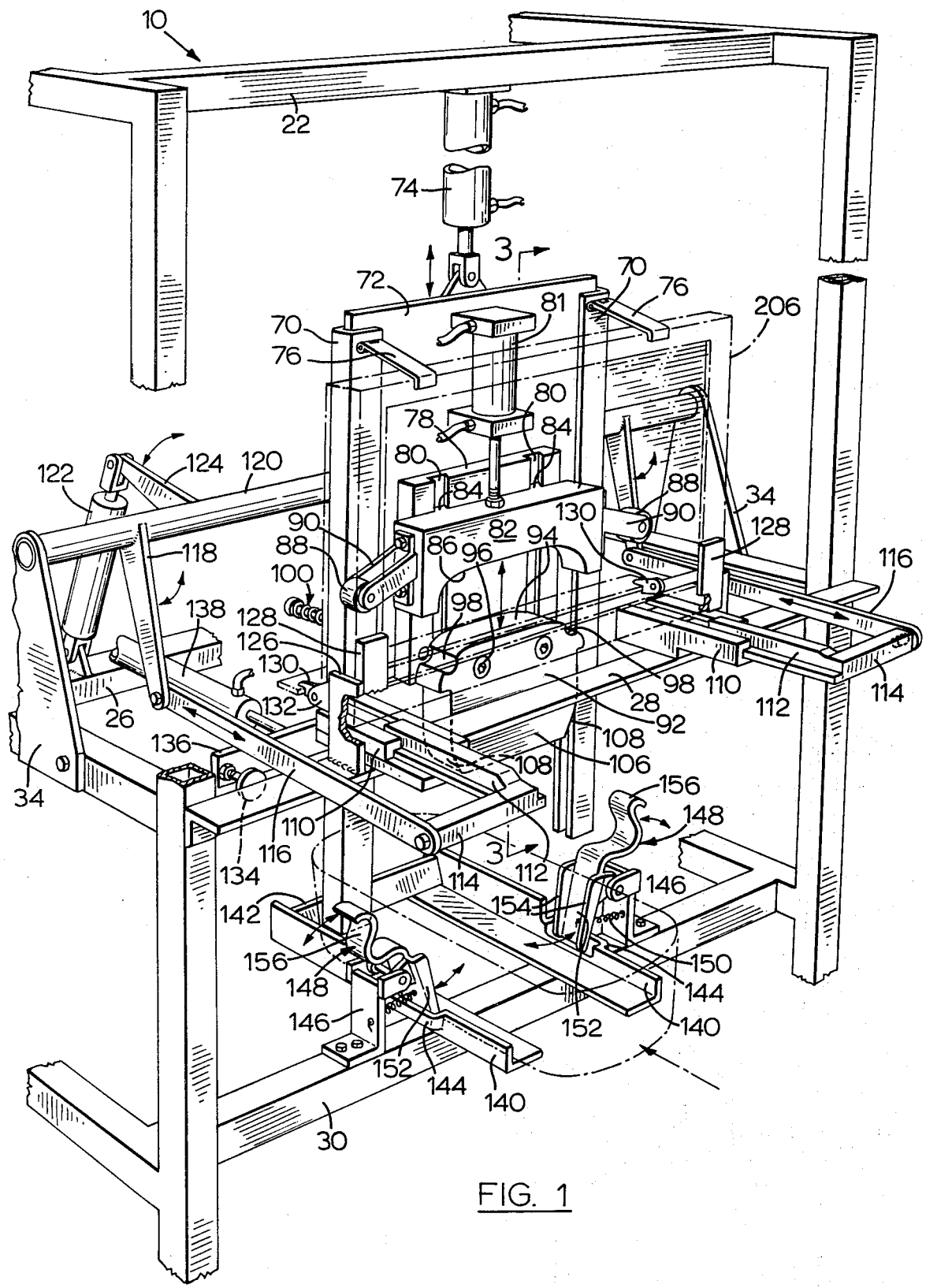
FIG. 1 is a partially sectioned front view of a portion of an apparatus according to an embodiment of the present invention.

In use, a plurality of steamed handles 204 mounted within a magazine 206 are located, as shown in broken lines in FIG. 1 of the drawings, with the discharge end of the magazine opening onto the guides 110 (FIG. 3) and the upper end of the magazine retained in the vertical position by the latches 76 (FIG. 1).

Figure 4:
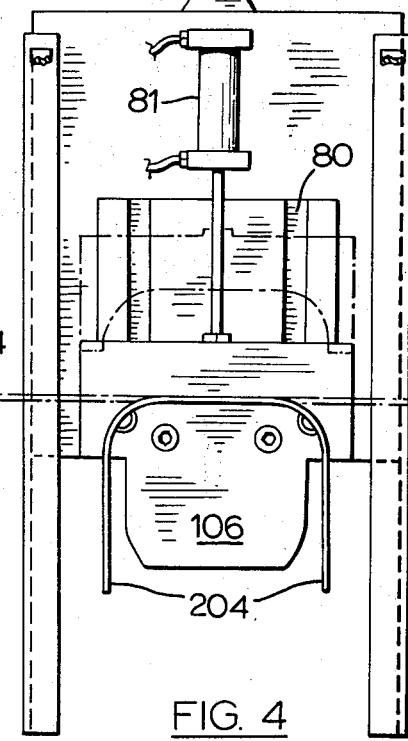
FIG. 4 is a partial front view taken in the direction of the arrows 4—4 of FIG. 3.

The clutch mechanism 60 is operated by the foot pedal 62 so that the cam shaft 50 is rotatably driven. Cam 52 operates pneumatic cylinders 122 which cause the pushers or spurs 112 (FIG. 3) to move towards the magazine 206 to dispense a handle from the magazine to a position overlying the upper surface of the anvil 92. When the handle 204 is in this position, the small latches 130 drop down to the position shown in FIG. 3 wherein they serve to prevent the handle from moving out of its operative position overlying the anvil 92. The cam 52 then causes the assembly 122 to be deactivated causing the stripper to return to the retracted position shown in FIG. 3. The cam 54 operates the air cylinder 81 which drives the former 82 from the position shown in broken lines in FIG. 4 to the closed position, also shown in FIG. 4, causing handle 204 to move from the position shown in broken lines to the formed position.

With the clamping force of the cylinder 81 remaining effective, the cam 56 operates the valve C to cause the drive cylinder 74 to drive the face plate and supported components downwardly towards the handle mounting station in which a basket 200 has previously been located.

Figure 5:
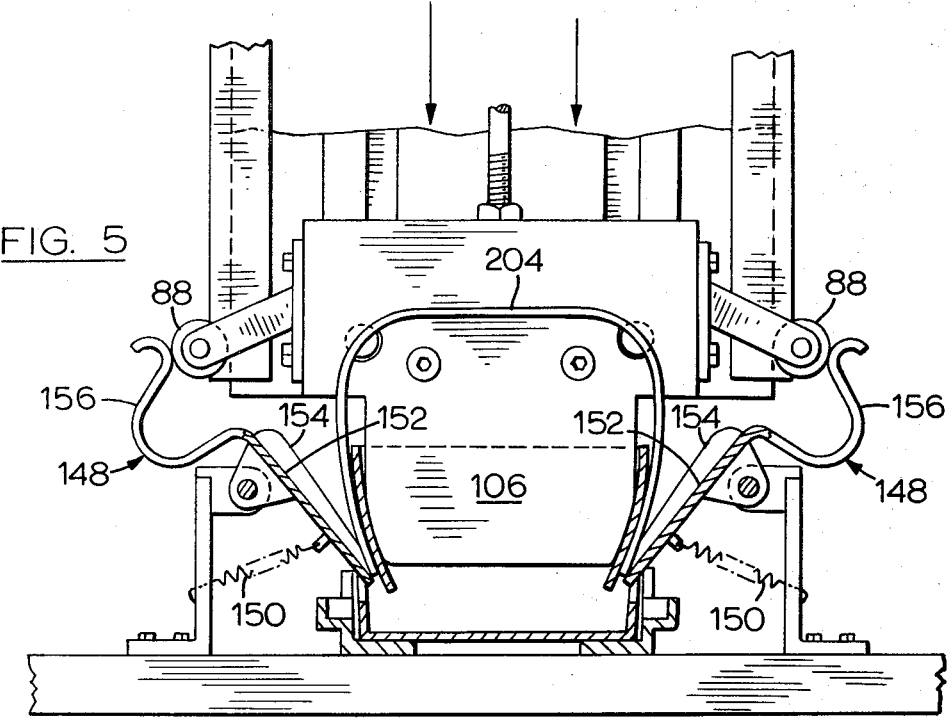
FIG. 5 is a view similar to FIG. 4 showing a further step in the method of the present invention.

As shown in FIG. 5 of the drawings, the cam rollers 88 engage the inwardly directed crests of the upper ends 156 of the fingers 148 so as to direct the lower ends of the fingers inwardly into engagement with the side walls of the basket to deflect the slotted portions of the baskets inwardly. The handle 204 is guided into the slot formed in the basket by the fingers and aligned therewith by riding in the U-shaped channels formed by the side walls 154 and the lower portion 152 of the fingers. Further lowering of the clamping mechanism causes the cam rollers 88 to pass into the valleys of the cam surface permitting the fingers 148 to be withdrawn by means of the tension springs 150. The valve B then releases the clamping action to cause the cylinder 81 to raise the former 82 out of engagement with the anvil. As soon as the former 82 has been raised clear of the ejection passages 102, the ejector mechanism is operated to eject the handle and its associated carton from the handle. After ejection of the handle from the anvil, the anvil is raised by activating the cylinder 81 which causes the rollers 88 to again pass over the crests of the cam surfaces 156. It will be noted that by the time the rollers 88 engage the cam surfaces 156, the basket has been removed to the position shown in FIG. 7 of the drawings wherein the handle is out of alignment with the fingers.

Figure 8:
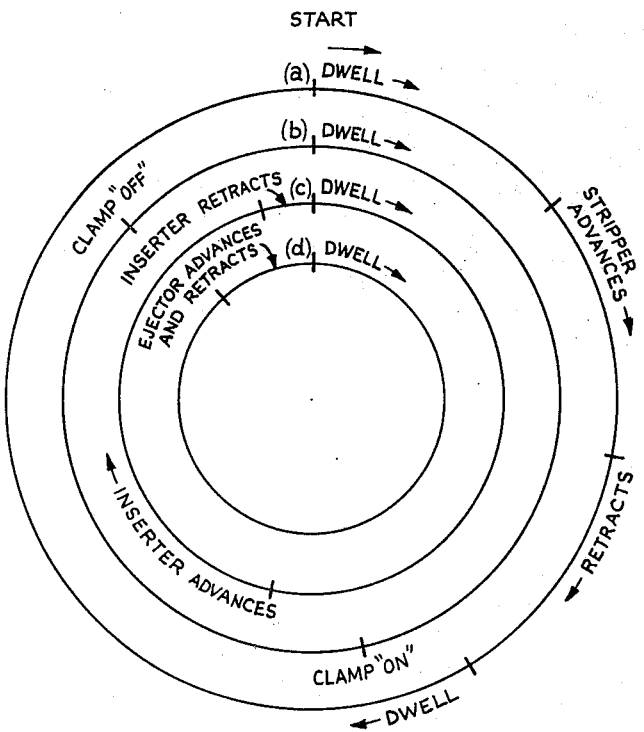
FIG. 8 is a diagrammatic illustration of the sequence of events in the method of the invention.

The sequence of events in the operation of the apparatus is diagrammatically illustrated in FIG. 8 of the drawings, wherein the operation and time of the stripper 112, clamp 82, 92 insert fingers 148 and ejector 100 are diagrammatically indicated on ring (a), (b), (c) and (d) respectively. The rings *a; b; c;* and *d* also correspond to the valves *a; b; c;* and *d* previously described with reference to cams 52; 54; 56 and 58 respectively.

After removal of the basket and its associated handle, the handle may be stapled to the side walls of the basket by a conventional stapling device. The handle may alternatively be secured by glue or any other conventional means.

From the aforegoing, it will be apparent that the apparatus of the present invention is capable of automatically bending and locating handles in slots formed on the side walls of a basket. The apparatus is capable of operating at high speed so that the only operation which is carried out manually is the location of the basket in the loading station. It will be understood that a suitable micro-switch may be provided in the loading station so as to ensure that a basket is operatively positioned in the required position. In addition, the loading connection may be modified so as to provide a built-in stapling device for stapling the handles in position.

In a further modification, the apparatus may be adapted to be automatically fed with containers.

These and other modifications will be apparent to those skilled in the art without departing from the scope of this invention.

The embodiments of the invention in which an exclusive property or privilege is claimed are defined as follows:

1. An apparatus for mounting a handle on a basket having a pair of oppositely disposed side walls, each formed with a U-shaped slot to receive an end of a handle comprising
   a. a frame having a handle mounting station,
   b. means for mounting a basket in said handle mounting station,
   c. slot opening finger means disposed on opposite sides of said station and movable between a retracted position outwardly of said station and an extended position inwardly of said station to open said slots of a basket in use, d. means for clamping a handle in a position with the ends thereof aligned with the slots of a basket in said station,
e. means for moving said handle clamping means towards and away from said station,
f. means on said handle clamping means for engaging said finger means as said handle clamping means moves towards said station to cause said finger means to move to said extended position to open said slot.

2. An apparatus as claimed in claim 1 wherein each of said finger means has cam track means formed thereon and wherein said means on said handle clamping means comprises a pair of cam rollers disposed one on either side thereof to engage said cam track means when moving towards said station.

3. An apparatus as claimed in claim 1 wherein each of said finger means is formed with a U-shaped guide rail for receiving the ends of a handle and guiding the handle longitudinally thereof towards said station.

4. An apparatus as claimed in claim 2 wherein each of said cam tracks has a leading end formed with an inwardly directed crest for engagement with said cam rollers to move said finger means inwardly into engagement with a basket in use when said handle clamping means is in a position to insert the ends of a handle into the slot means.

5. An apparatus as claimed in claim 1 including stop means carried by said handle forming means and disposed within a basket in use to limit the extent to which said slots are opened by said finger means.

6. An apparatus as claimed in claim 1 including a handle forming station disposed above said handle mounting station, said handle clamping means being mounted to reciprocate between said handle forming station and said handle mounting station.

7. An apparatus as claimed in claim 6 wherein said handle clamping means comprises an anvil member having an upper surface formed about a contour of the upper end of the handle to be clamped therein and a former having an inner surface formed to complement said upper surface of said anvil, and drive means for driving said former towards said anvil to form a handle to the shape of said anvil in use.

8. An apparatus as claimed in claim 7 including a handle storage station for storing a plurality of handles in a flattened configuration, dispenser means for dispensing handles one at a time from said storage station into said forming station to be located between said anvil means and said forming means.

9. An apparatus as claimed in claim 1 including means for rejecting a carton from said handle mounting station after a handle has been located thereon.

10. An apparatus for mounting a handle on a basket having a pair of oppositely disposed side walls each formed with a U-shaped slot to receive an end of a handle comprising
a. a frame,
b. means for mounting a basket in a handle mounting station on said frame,
c. a pair of slot opening levers pivotably mounted one on either side of said station and movable between a retracted position outwardly of said station and an extended position inwardly of said station to open the slots of a basket in use,
d. clipping means for urging said fingers to said retracted position,
e. each of said lever means having a cam track surface formed thereon upwardly of said pivotal mount,
f. a pair of longitudinally extending guide rails mounted in said frame and extending upwardly from said handle mounting station,
g. a face plate mounted to reciprocate within said guide track means,
h. drive means for driving said face plate longitudinally of said guide track means,
i. a handle forming station disposed above said handle mounting station,
j. an anvil member rigidly mounted on said face plate and having an upper surface formed to the required contour of the upper end of the handle to be clamped thereon, and
k. a former having an inner surface formed to complement the upper surface of the anvil, said former being reciprocally mounted on said face plate for movement between an elevated position spaced above said anvil and a lowered position closely adjacent said anvil to form a handle therebetween and guide means for reciprocally driving said former,
l. handle storage means for storing a plurality of handles in a flattened relationship,
m. dispenser means for dispensing said handles from said storage means one by one into said forming station in a position between said anvil and said former,
n. cam roller means carried by said former and engaging said cam track means when driven towards said mounting station so as to cause said finger means to open said slot means to receive a handle formed to a generally U-shaped configuration in said forming station, said anvil having a lower portion projecting into said forming station when in said lowered position so as to form stop means for limiting the inward deflection of said basket during opening of said slots.

* * * * *